(12) United States Patent
Kamei et al.

(10) Patent No.: US 8,605,436 B2
(45) Date of Patent: Dec. 10, 2013

(54) OUTDOOR DISPLAY APPARATUS

(75) Inventors: Mitoku Kamei, Ohta (JP); Masaya Nakamichi, Kizugawa (JP)

(73) Assignee: Sanyo Electric Co., Ltd, Moriguchi (JP)

( * ) Notice: Subject to any disclaimer, the term of this patent is extended or adjusted under 35 U.S.C. 154(b) by 180 days.

(21) Appl. No.: 13/341,971

(22) Filed: Dec. 31, 2011

(65) Prior Publication Data

US 2012/0195002 A1    Aug. 2, 2012

(30) Foreign Application Priority Data

Jan. 31, 2011   (JP) .................................. 2011-018492

(51) Int. Cl.
  *H05K 7/20*   (2006.01)
(52) U.S. Cl.
  USPC .............................. 361/695; 165/121; 62/260
(58) Field of Classification Search
  USPC .......... 361/690, 694–695, 715; 165/121–122; 62/260
  See application file for complete search history.

(56) References Cited

U.S. PATENT DOCUMENTS

| 2,007,406 | A  | * | 7/1935  | Miller ............................. 165/45 |
| 6,810,945 | B1 | * | 11/2004 | Boissevain ....................... 165/45 |
| 2009/0147170 | A1 |  | 6/2009 | Oh et al. |
| 2011/0075361 | A1 |  | 3/2011 | Nakamichi et al. |
| 2011/0100357 | A1 | * | 5/2011 | Wagener ....................... 126/643 |

FOREIGN PATENT DOCUMENTS

| JP | 10-054584 A   |   | 2/1998  |           |
| JP | 2005248673 A  | * | 9/2005  | ............. E01C 11/26 |
| JP | 2009-294284 A |   | 12/2009 |           |

* cited by examiner

*Primary Examiner* — Robert J Hoffberg
(74) *Attorney, Agent, or Firm* — NDQ & M Watchstone LLP

(57) ABSTRACT

The outdoor display apparatus has a display unit, a blowing unit which generates air along the display unit, and a channel part which emits the air passed the display unit, wherein the channel part is extended to the lower part of the displaying unit from its side part, and at least a portion of the channel part is laid underground.

1 Claim, 7 Drawing Sheets

OUTDOOR DISPLAY APPARATUS

CROSS-REFERENCE TO RELATED APPLICATIONS

This application is based on Japanese Patent Application No. 2011-018492 filed on Jan. 31, 2011, the contents of which are hereby incorporated by reference.

BACKGROUND OF THE INVENTION

1. Field of the Invention

The present invention relates to a display apparatus, specifically relates to an outdoor display apparatus.

2. Description of the Related Art

In recent years, large-sized display apparatuses called "digital signage" which are deployed outdoors, and display information such as advertising information are emerging.

When these apparatuses are installed outdoors, liquid crystal panel may not operate properly due to heat caused by sunlight. Thus, it is necessary to employ a structure for cooling the panel.

One idea is to employ a fan for generating an air flow and thereby cooling the liquid crystal panel.

Further, the inventors of the present application has focused an attention to the fact that while the thermal conductivity of air is about 0.026 [W/m·K], the thermal conductivity of the ground is as large as 0.62. By notifying this characteristic, the inventors have invented a display apparatus which can further improve the cooling capability.

SUMMARY OF THE INVENTION

The display apparatus of the present invention comprises a display unit, a blowing unit which generates air along the display unit, and a channel part which emits the air passed the display unit, wherein the channel part is extended to the lower part of the displaying unit from its side part, and at least a portion of the channel part is laid underground.

DESCRIPTION OF THE PREFERRED EMBODIMENTS

The embodiments of the present invention are described below.

First Embodiment

Figure 1:
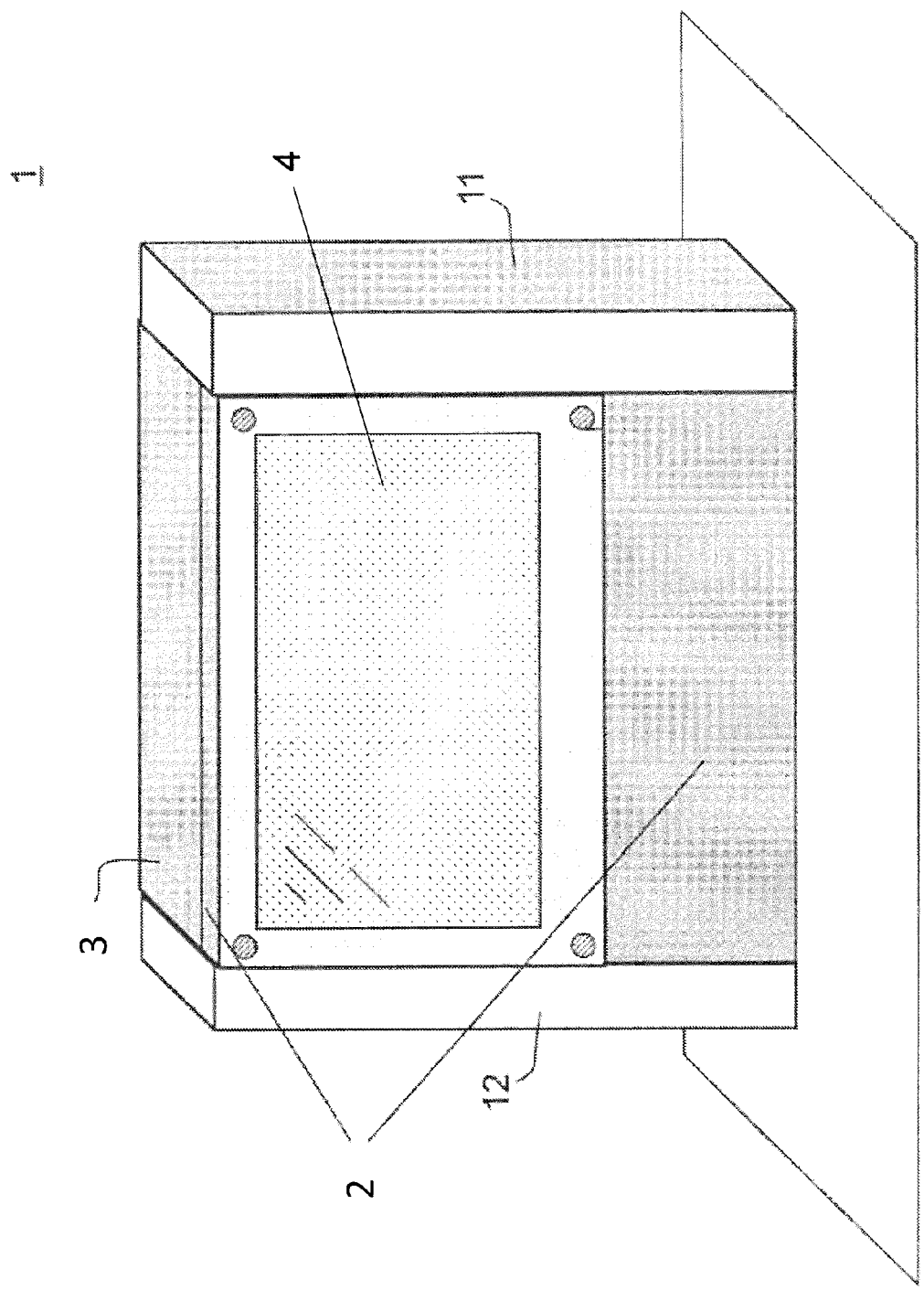
FIG. 1 is a front perspective view of the display apparatus 1.

FIG. 1 is a front perspective view of the display apparatus 1 regarding to the first embodiment of the present invention. As shown in the figure, in the apparatus 1, a display unit 4 formed by a liquid crystal panel is accommodated in a casing consisted by a front cabinet 2 and a back cabinet 3. On the right side (when viewed from the front side) of the cabinet, an intake duct 11 is attached, and on the left side of the cabinet, an exhaust duct 12 is attached.

Figure 2:
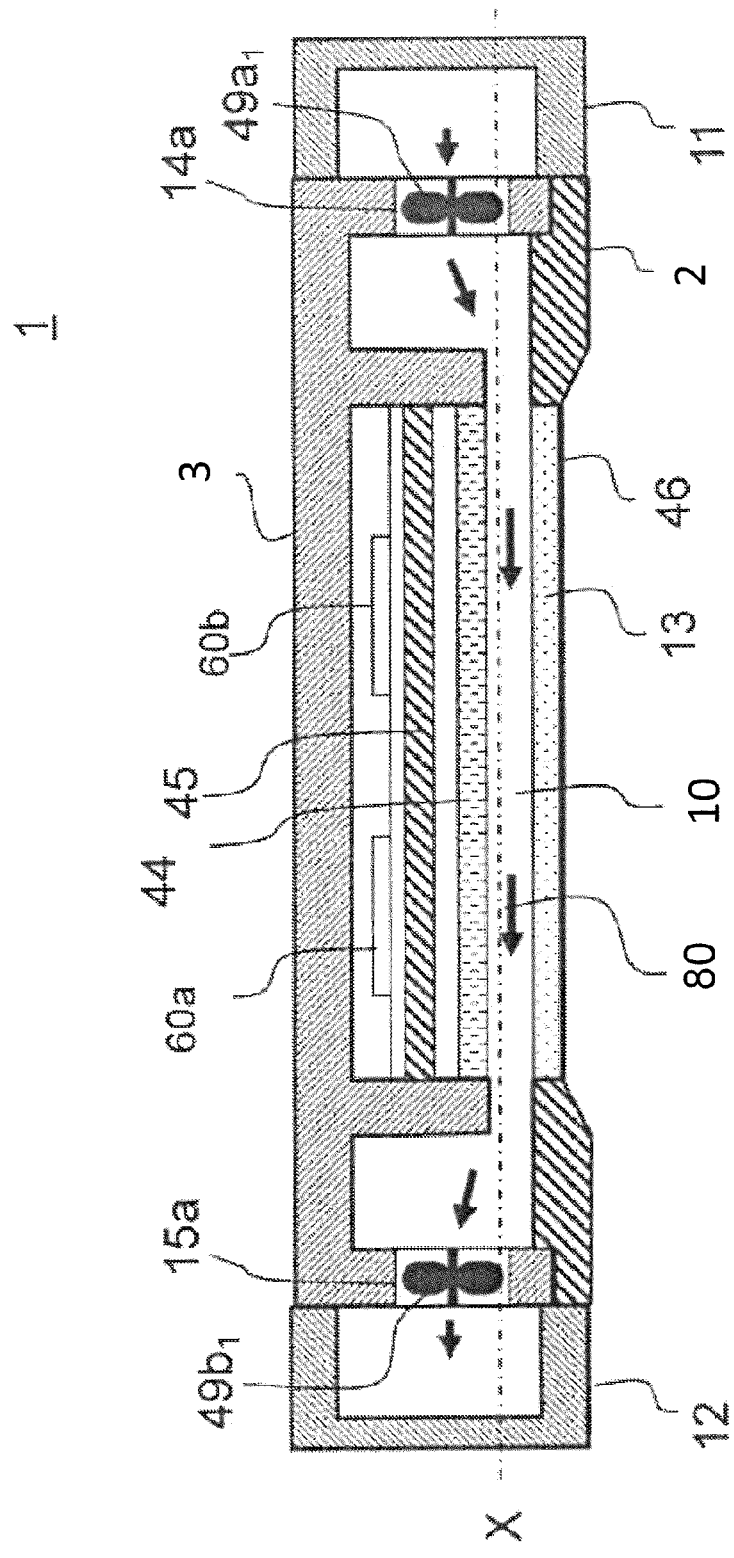
FIG. 2 is a sectional view of the apparatus 1, showing its cooling structure from the above.
Figure 3:
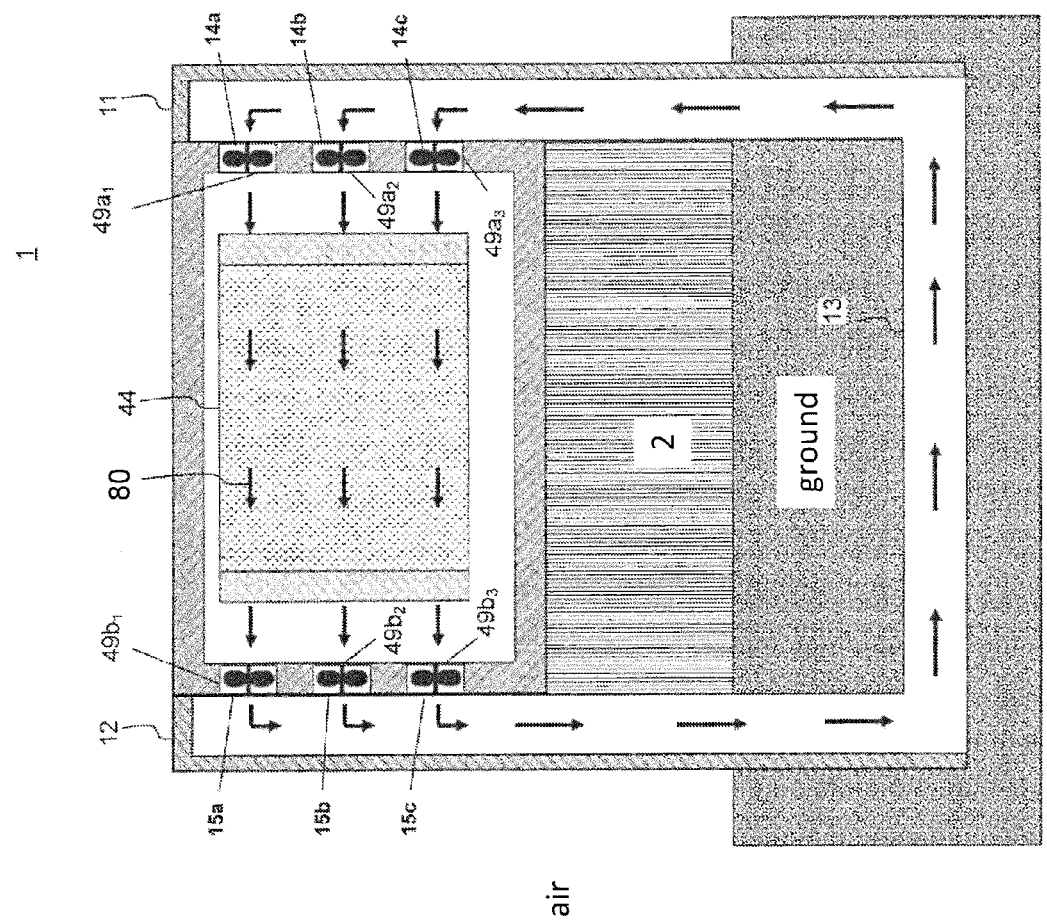
FIG. 3 is a sectional view of the apparatus 1, showing its cooling structure from the front side.

FIG. 2 is a sectional view describing a cooling structure of the apparatus 1, when viewed from its upper side. FIG. 3 is another sectional view describing the cooling structure, when viewed from its front side.

Inside the cabinet, the display unit 4 comprising a display panel 44 and a backlight 45 is formed. In the backside of the unit 4, a power supply part 60a for supplying a power supply to the unit 4, and a control circuit 60b for controlling an operation of the unit 4 are arranged.

In the front side of the display panel 44, a transparent front glass 13 for protecting the display panel 44 is arranged. In the front side of this glass 13, a transparent sheet-like touch panel 46 is arranged. This touch panel 46 is detects the variation of an electric capacity caused by an approach of people's finger.

The image displayed on the display panel 44 is viewable through the front glass 13 and the touch panel 46.

Between the front side of the display panel 44 and the front glass 13, a space 10 for passing air is provided. On the right side of the space 10, an inlet 14 is provided, and on the left side of the space 10, an outlet 15 is provided. On the right side of the inlet 14, an air intake duct 11 is provided and on the left side of the outlet 15, an air exhaust duct 12 is provided. Further, an air intake fan 49a is arranged in the inlet 14, and air exhaust fan 49b is arranged in the outlet 15.

Referring to FIG. 3, inlets 14, the outlets 15, intake fans 49a, and exhaust fans 49b are formed in three places such that they align in the up-and-down direction. Namely, the inlets consists of inlet 14a, 14b, and 14c, the outlets consists of outlet 15a, 15b, and 15c, the fans 49a consists of fan 49a1, 49a2, and 49a3, and the fans 49b consists of fan 49b1, 49b2, and 49b3. Further, in each of the inlets 14 or outlets 15, a filter for preventing rain or dust from going inside the display apparatus 1 may be arranged. The cooling fans 49 consist of the fans 49a and the fans 49b.

By rotating the cooling fans 49, the airflow 80 from the inlet 14 to the outlet 15 is generated as shown by arrows in FIG. 2 or 3. Thereby, an airflow 80 between the inlet 14 and outlet 15 is generated inside the space 10 (i.e. the space between the display panel 44 and the front glass 13). By this airflow 80, the liquid crystal panel 44 is cooled.

Referring to FIG. 3, the intake duct 11 has a structure such that it covers three inlets 14 from their outer sides. Similarly, the exhaust duct 12 has a structure such that it covers three outlets 15 from their outer sides.

Figure 4:
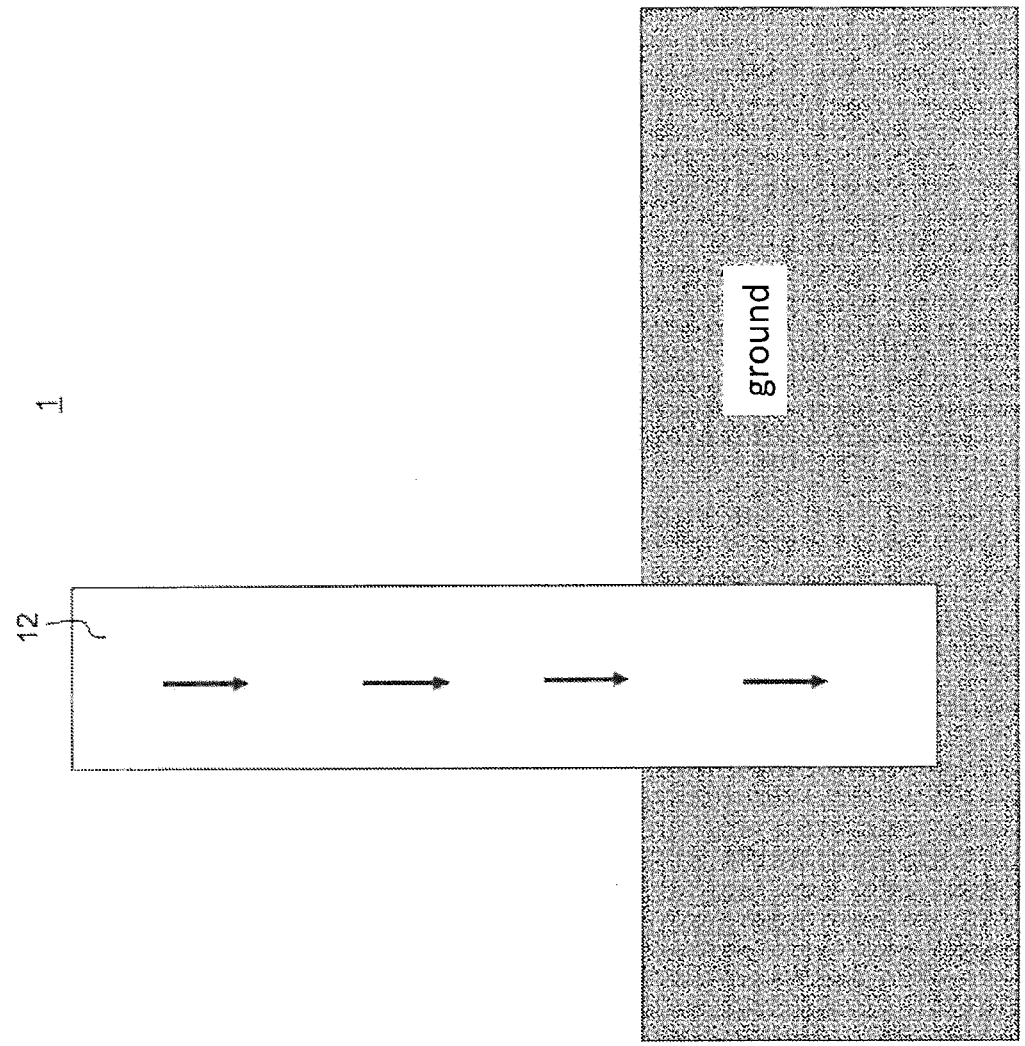
FIG. 4 is a sectional view of the apparatus 1, showing its cooling structure from the left side.

The lower part of the ducts 11 and 12 are laid underground (see FIG. 4 also). The ducts 11 and 12 communicate each other underground via communicating duct 13. Thereby, the heat generated from the liquid crystal panel 44 is led underground by the exhaust fan 49b through exhaust duct 12. Further, since the exhaust duct 12 and the intake duct 11 are communicated by the duct 13, the circulation pass of the air is formed.

Assuming that the temperature of the heat emitted from the liquid crystal panel 44 is 50 degrees Celsius, for example, and the temperature of the ground is 15 degrees Celsius, the air led underground via the exhaust duct 12 should be cooled efficiently. The cooled air reaches the liquid crystal panel 44 again through the intake duct 11. Thereby, the liquid crystal panel is cooled efficiently.

Second Embodiment

Figure 5:
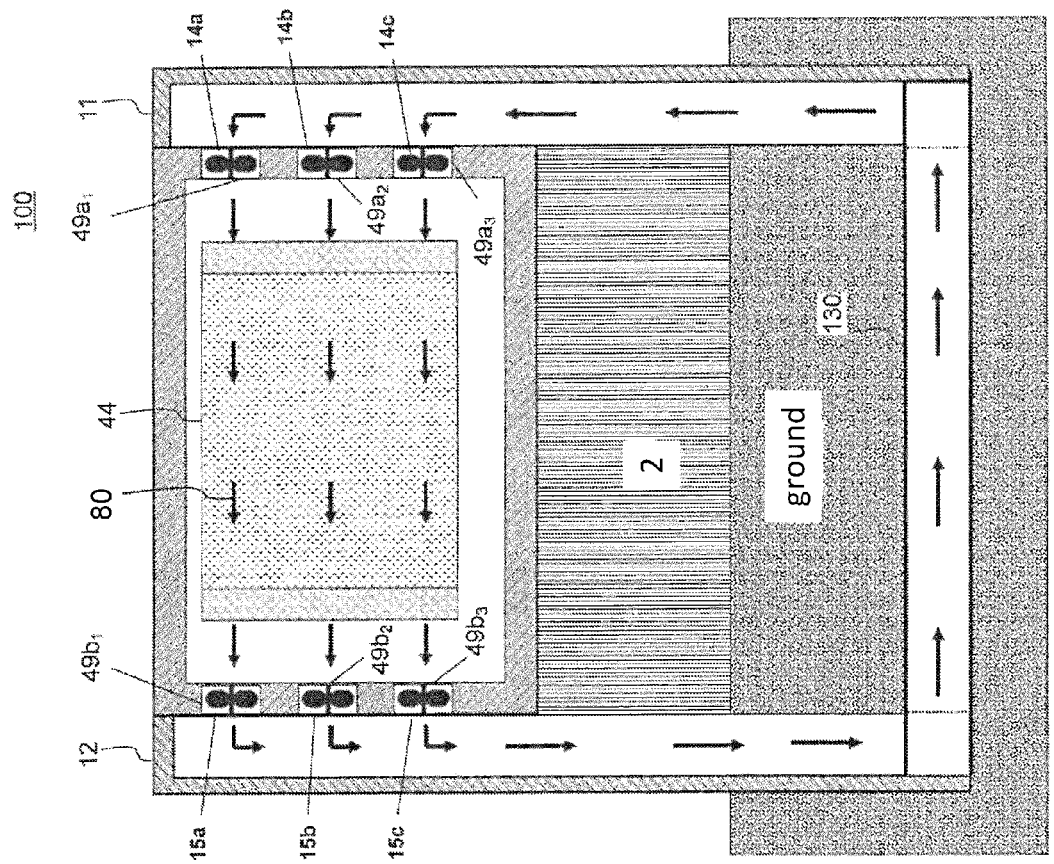
FIG. 5 is a sectional view of the display apparatus 100, showing its cooling structure from the front side.
Figure 6:
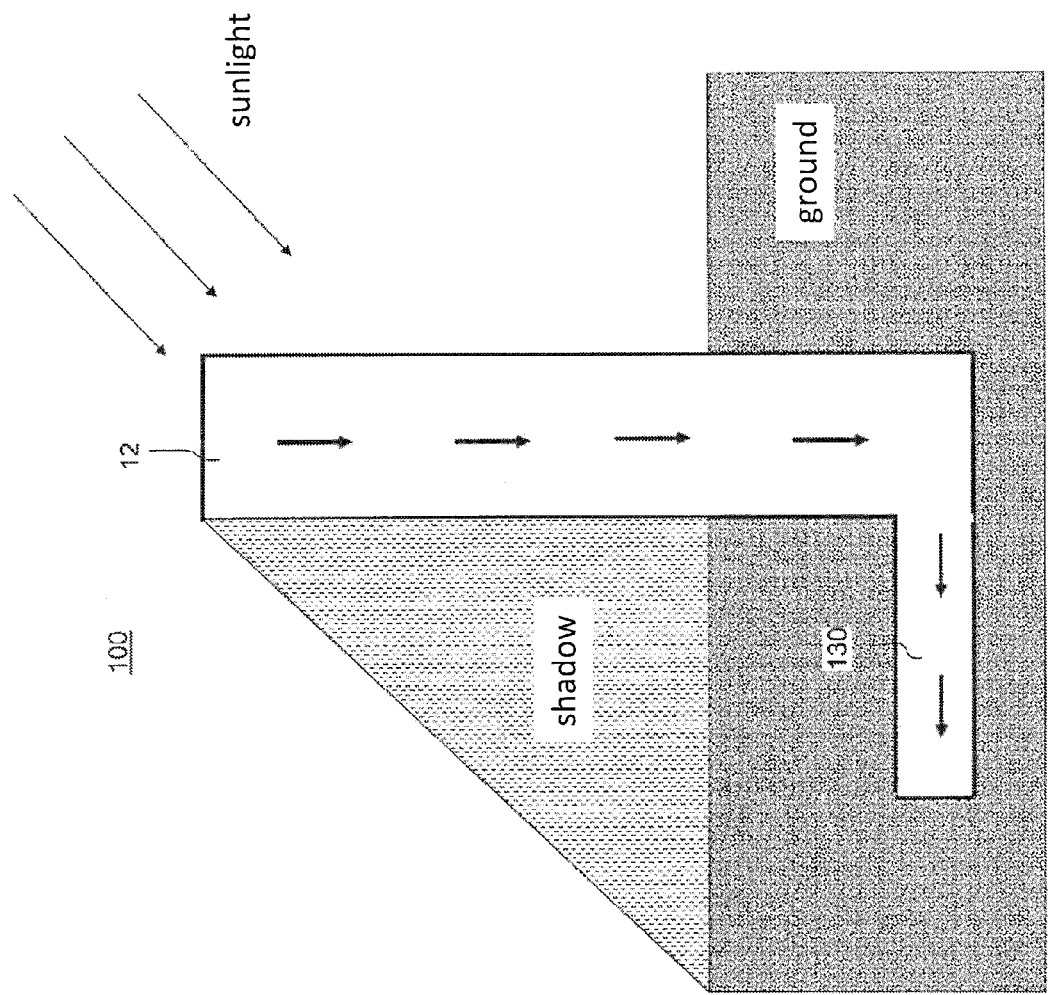
FIG. 6 is a sectional view of the display apparatus 100, showing its cooling structure from the left side.

FIGS. 5 and 6 are sectional views of a display apparatus 100 regarding to the second embodiment of the present invention. When display apparatus is installed outdoors, either one of the two sides (i.e. front side or back side) becomes a shaded (or shadowed). Thus, it is preferable to radiate heat generated by the panel 44 to this shaded area. In view of this, in the apparatus 100, a communicating duct 130 for communicating the duct 11 and 12 is bent backward. In other words, the duct 130 is provided so that it is laid underground of the area shaded by the cabinet of the apparatus 100. Thereby, it can further achieve an efficient cooling.

Third Embodiment

Figure 7:
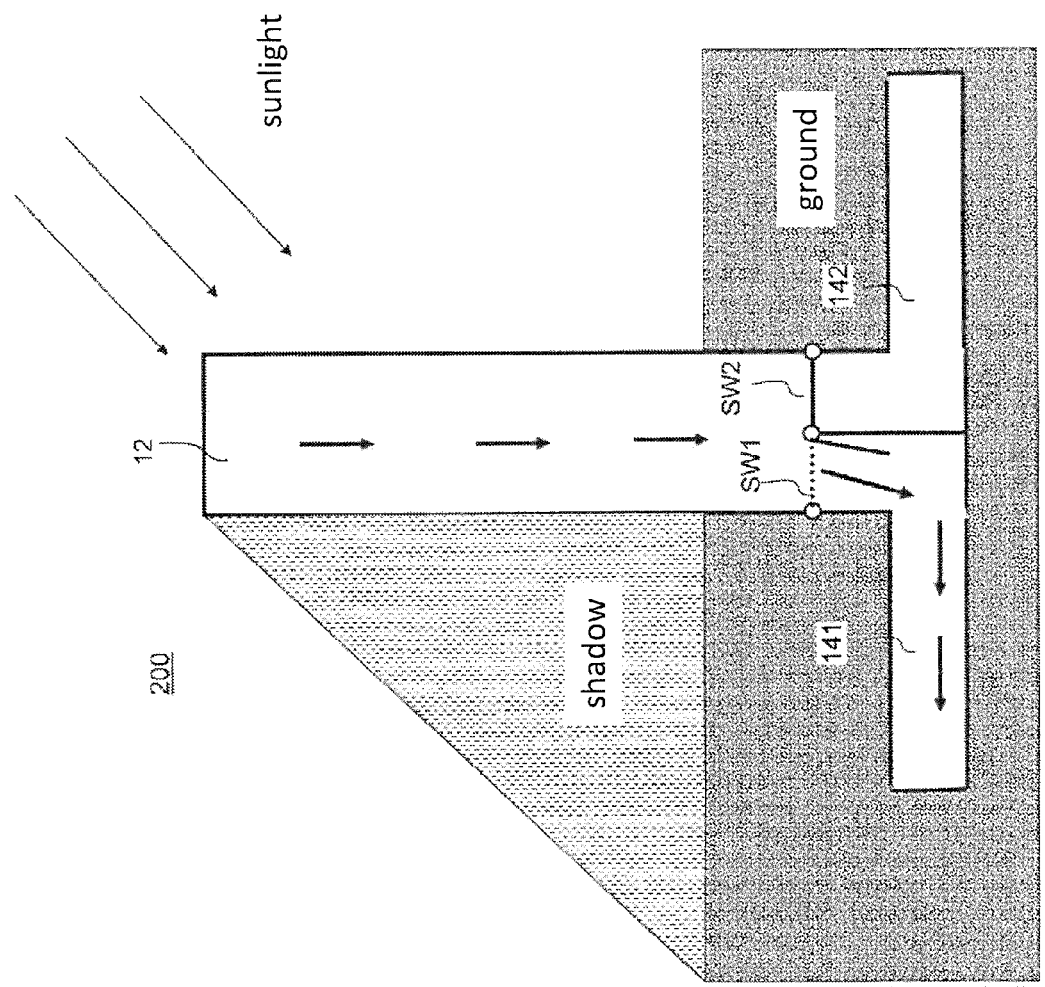
FIG. 7 is a sectional view of the display apparatus 200, showing its cooling structure from the left side.

FIG. 7 is a sectional view of a display apparatus 200 regarding to the third embodiment of the present invention. This is a view seen from its left side. The direction of the sun changes depending on the time in a day. Further, depending on the owner of the apparatus 200, installation direction of the apparatus may be various. In view of this, in the apparatus 200, the communicating duct, which communicates the duct 11 and 12, comprises a first duct 141 and a second duct 142. In the entrance portion of the ducts 141 and 142, switches SW1 and SW2 are provided respectively. Thereby, the air exhausted from the duct 12 can communicate to the duct 11, selectively by the duct 141 or 142.

For example, as shown in FIG. 7, when the sunlight is irradiating from the displaying side of the apparatus 100 and the side opposite from the displaying side is becoming a shaded area, heat can be emitted efficiently if an air passed through the duct 12 is entered to the first duct 141 which is in the shaded side rather than the second duct 142. Thus, SW1 is set open while SW2 is set closed.

On the other hand, depending on time in a day, the sunlight may irradiate from the opposite side of the displaying side and the displaying side may become shaded. For example, in the morning, the sun may shine from the displaying side, and in the evening the sun may shine from the rear side of the displaying side. In such case, it preferable to set SW1 closed and SW2 opened.

Instead of SW1 and SW2, a moving wall may be employed. When the moving wall moves to one side, air from the duct 12 enters to the first duct 141. When the moving wall moves to another side, air from the duct 12 enters to the second duct 142.

The embodiment of the present invention is described as above. However, the scope of the present invention is not limited to this. It can be modified variously within the scope of the present invention without deviating from the spirit thereof. For example, a liquid crystal display panel is explained as an example of the display unit. However, a plasma panel, organic electroluminescence panel, electronic paper, CRT, or an advertising film may be employed instead.

Instead of emitting the heat generated by the liquid crystal panel using the duct (i.e. hollow-centered component), in which the air flow inside, the heat may be emitted using a component (i.e. solid-core like component) having a high thermal conductivity, such as metal.

What is claimed is:
1. A display apparatus comprising:
a display unit;
a cabinet accommodating the display unit,
a blowing unit generating air passing through the display unit, and
a channel part emitting the air passing over at least a portion of a surface of the display unit, the channel part extending from a side part of the displaying unit and extending below a lower part of the displaying unit, at least a portion of the channel part laying underground, the at least a portion of the channel part laying underground comprises a first channel part and a second channel part,
a switching unit selectively controlling the destination of the air passing over the at least the portion of the surface of the display unit to either the first channel part and the second channel part according to which one of the first channel part and the second channel part is below an area formed by a shadow formed by a sun shining on the cabinet, the shadow changes position as the sun moves across a sky between a sunrise and a sunset each day.

* * * * *